(12) United States Patent
Kim

(10) Patent No.: US 12,086,307 B2
(45) Date of Patent: Sep. 10, 2024

(54) INTEGRATED GAZE TRACKER AND OPERATION METHOD THEREOF

(71) Applicant: SAMSUNG ELECTRONICS CO., LTD., Suwon-si (KR)

(72) Inventor: Woo-Shik Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 570 days.

(21) Appl. No.: 17/472,989

(22) Filed: Sep. 13, 2021

(65) Prior Publication Data
US 2022/0197375 A1     Jun. 23, 2022

(30) Foreign Application Priority Data
Dec. 17, 2020 (KR) .......................... 10-2020-0177440

(51) Int. Cl.
*G06F 18/214* (2023.01)
*G06F 3/01* (2006.01)
*G06F 18/28* (2023.01)
*G06T 1/60* (2006.01)
*G06T 7/20* (2017.01)
*G06V 30/28* (2022.01)
*G06V 40/16* (2022.01)

(52) U.S. Cl.
CPC .............. *G06F 3/013* (2013.01); *G06T 1/60* (2013.01); *G06T 7/20* (2013.01); *G06V 40/171* (2022.01); *G06T 2207/30196* (2013.01)

(58) Field of Classification Search
CPC ......... G06F 3/013; G06V 40/171; G06T 1/60; G06T 7/20; G06T 2207/30196
See application file for complete search history.

(56) References Cited

U.S. PATENT DOCUMENTS

| | | | | |
|---|---|---|---|---|
| 2007/0110160 A1* | 5/2007 | Wang | ...................... | H04N 19/57 |
| | | | | 375/E7.125 |
| 2015/0281613 A1* | 10/2015 | Vogelsang | ........... | H04N 25/772 |
| | | | | 348/300 |
| 2017/0004092 A1* | 1/2017 | Haraden | ................. | G06F 13/28 |
| 2017/0091549 A1* | 3/2017 | Gustafsson | ............. | G06F 3/012 |

(Continued)

FOREIGN PATENT DOCUMENTS

| | | |
|---|---|---|
| JP | 6725733 B2 | 7/2020 |
| KR | 10-1554094 B1 | 9/2015 |

(Continued)

OTHER PUBLICATIONS

Hong et al., "A 2.71nJ/Pixel 3D-Stacked Gaze-Activated Object-Recognition System for Low-Power Mobile HMD Applications", 2015, IEEE International Solid-State Circuits Conference, 3 pages total.

(Continued)

*Primary Examiner* — Mark Roz
(74) *Attorney, Agent, or Firm* — Sughrue Mion, PLLC

(57) ABSTRACT

An integrated gaze tracker includes a pixel array configured to capture an image to provide an output signal comprising the image; a memory configured to store an image data unit to be read out in units of lines based on the output signal of the pixel array; and a processor configured to generate a gaze vector based on partial image data comprising the image data unit, among entire image data included in the output signal.

18 Claims, 14 Drawing Sheets

(56) References Cited

U.S. PATENT DOCUMENTS

2018/0004287 A1    1/2018  Yoo et al.
2021/0264192 A1    8/2021  Eki

FOREIGN PATENT DOCUMENTS

KR        10-1638095 B1    7/2016
KR    10-2016-0107374 A    9/2016

OTHER PUBLICATIONS

Garbin et al., "OpenEDS: Open Eye Dataset", May 2019, arXiv: 1905.03702v2 [cs.CV], 11 pages total.
Kim et al., "NVGaze: An Anatomically-Informed Dataset for Low-Latency, Near-Eye Gaze Estimation", 2019, SIGCHI Conference on Human Factors in Computing Systems, 12 pages total.

* cited by examiner

PARALLEL INTERFACE

SERIAL INTERFACE

INTEGRATED GAZE TRACKER AND OPERATION METHOD THEREOF

CROSS-REFERENCE TO RELATED APPLICATION

This application is based on and claims priority under 35 U.S.C. § 119 to Korean Patent Application No. 10-2020-0177440, filed on Dec. 17, 2020, in the Korean Intellectual Property Office, the disclosure of which is incorporated by reference herein in its entirety.

BACKGROUND

1. Field

Apparatuses and methods consistent with example embodiments relate to an integrated gaze tracker and an operation method thereof.

2. Description of the Related Art

Gaze tracking is a technology that calculates a gaze vector, which is a direction that a person's eye is gazing.

The gaze tracking technology may be utilized as a user interface or foveated rendering that focuses on or concentrates and renders what a user views in a Head Mounted Display (HMD), a Virtual Reality (VR) headset, Augmented Reality (AR) Glasses, etc. In addition, a driver monitoring system may calculate a gaze vector of a driver utilizing the gaze tracking technology to determine whether the driver is drowsy, whether the driver's gaze moves in a direction different from a traveling direction to put the driver in a dangerous situation, etc.

The gaze tracking technology needs to calculate a gaze vector that changes rapidly in real time, and thus requiring fast processing. In addition, in order for the gaze tracking technology to be utilized in a user interface, a small amount of power needs to be consumed by a gaze tracker, and the gaze tracking technology needs to be implemented in a small form factor.

SUMMARY

Provided are an integrated gaze tracker and an operation method thereof. Additional aspects will be set forth in part in the description which follows and, in part, will be apparent from the description, or may be learned by practice of the example embodiments of the disclosure.

Additional aspects will be set forth in part in the description which follows and, in part, will be apparent from the description, or may be learned by practice of the example embodiments of the disclosure.

According to an aspect of an embodiment, an integrated gaze tracker includes a pixel array configured to capture an image to provide an output signal including the image; a memory configured to store an image data unit to be read out in units of lines based on the output signal of the pixel array; and a processor configured to generate a gaze vector based on partial image data including the image data unit, among entire image data included in the output signal.

The processor may be further configured to: determine a start row number and an end row number of the image data unit located in the image; and determine the partial image data to include start row image data corresponding to the start row number and end row image data corresponding to the end row number.

The processor may be further configured to change at least one of the start row number and the end row number when new row image data is stored in the memory.

The processor may be further configured to: determine next partial image data to include next row image data when the next row image data is stored in the memory; and generate the gaze vector based on the partial image data and the next partial image data.

The memory may include a line memory configured to store the image in units of rows.

The memory may include two or more storage areas, the two or more storage areas may be configured to store different partial image data, and the processor may be configured to process the different partial image data in a ping pong buffer method.

The memory may include a static random access memory (SRAM).

The processor may be further configured to process the partial image data stored in the memory in units of columns to generate the gaze vector.

The processor may be further configured to generate the gaze vector based on data generated through feature points detection, ellipse fitting, and pupil center detection.

The processor may be further configured to generate the gaze vector based on a light signal generated by reflecting short wave infrared (SWIR) to a pupil.

The processor may be further configured to output at least one of position data of a pupil center, feature point data of a pupil, position data of the pupil, distance data between pupils, glint position data, or iris data.

The processor may be further configured to generate the gaze vector based on a neural network.

The processor may be further configured to output the gaze vector using a mobile industry processor interface (MIPI).

The processor may be further configured to output the gaze vector using a serial interface.

The integrated gaze tracker may be a system on a chip.

According to another aspect of an embodiment, an operation method of an integrated gaze tracker may include: capturing an image using a pixel array to provide an output signal including the image; storing an image data unit in a memory to be read out in units of lines based on the output signal of the pixel array; and performing processing by generating a gaze vector based on partial image data including the image data unit, among entire image data included in the output signal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
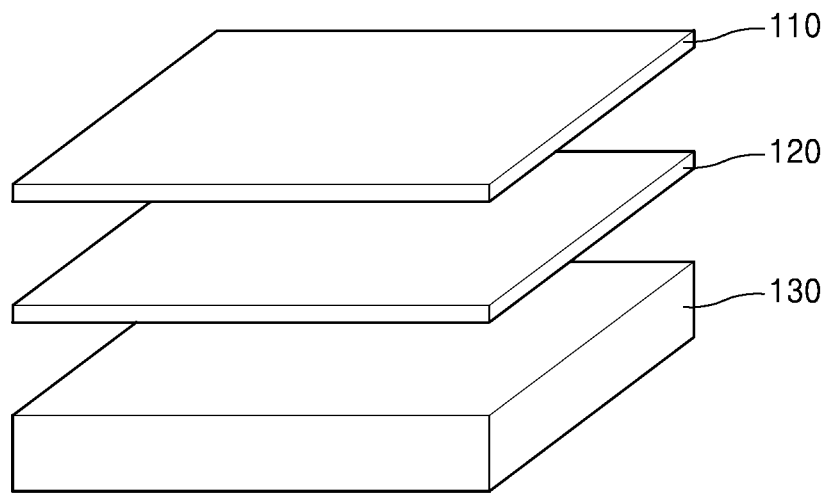
FIG. 1 shows an integrated gaze tracker according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The terms used in the present disclosure are selected based on general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

Throughout the specification, when a portion "includes" an element, unless otherwise described, another element may be further included, rather than the presence of other elements being excluded. The term used in the embodiments such as "unit" or "module" indicates a unit for processing at least one function or operation, and may be implemented in hardware or software, or in a combination of hardware and software.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein.

An embodiment provides an integrated gaze tracker and an operation method thereof. Hereinafter, the present disclosure will now be described more fully with reference to the accompanying drawings. Similar reference characters indicate corresponding features throughout the drawings, and exemplary embodiments are shown.

FIG. 1 shows an integrated gaze tracker 100 according to an embodiment.

Referring to FIG. 1, the integrated gaze tracker 100 according to an embodiment includes a pixel layer 110, a memory layer 120, and a logic layer 130.

The integrated gaze tracker 100 may be a system on chip. When the integrated gaze tracker 100 is implemented as a system on chip, the pixel layer 110, the memory layer 120, and the logic layer 130 may be arranged in a horizontal or vertical structure. In addition, the logic layer 130 may be divided according to functions and disposed in a different location. For example, the integrated gaze tracker 100 may be implemented as a system on chip by connecting the pixel layer 110, the memory layer 120, and the logic layer 130 to each other through a through silicon via (TSV), but is not limited thereto.

The pixel layer 110 may be configured to capture an image. The pixel layer 110 may include a pixel array based on a charge coupled device (CCD) or a complementary metal oxide semiconductor (CMOS).

The memory layer 120 may be configured to store image data. Because the memory layer 120 is integrated in the integrated gaze tracker 100, the integrated gaze tracker 100 may include a memory having a capacity to store image data and/or programs.

The logic layer 130 may be configured to control operations of the pixel layer 110 and the memory layer 120 and to perform digital image processing. The logic layer 130 may include a processor for digital signal processing. Further, the logic layer 130 may include an analog circuit for controlling the pixel layer 110 and processing an output signal of the pixel layer 110.

The integrated gaze tracker 100 may include the memory layer 120 and the logic layer 130 integrated in the pixel layer 110, thereby performing various operations. For example, the logic layer 130 may read and analyze image data stored in the memory layer 120 to obtain parameters for generating a gaze vector that is a direction in which a user's eye is gazing.

The integrated gaze tracker 100 may be used in various platforms such as a Head Mounted Display (HMD), a Virtual Reality (VR) Headset, Augmented Reality (AR) Glasses, a smartphone, a Personal Computer (PC), a laptop computer, a portable device, a wearable device, a driver monitoring system, foveated rendering, a vari-facal support, etc.

Figure 2:
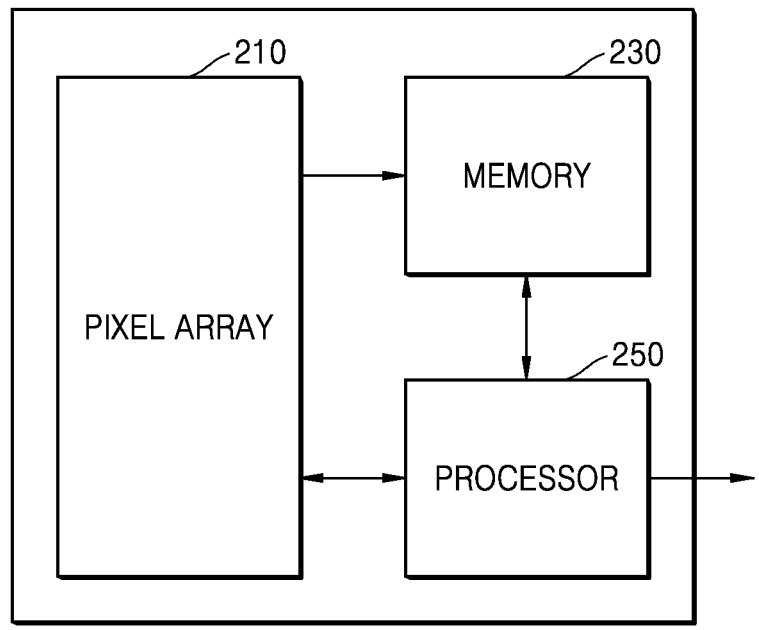
FIG. 2 is a diagram showing components of an integrated gaze tracker according to an embodiment.

FIG. 2 is a diagram showing components of an integrated gaze tracker 200 according to an embodiment.

Referring to FIG. 2, the integrated gaze tracker 200 according to an embodiment may include a pixel array 210, a memory 230, and a processor 250.

The pixel array 210 may be configured to capture an image, based on a control signal received from the processor 250. In an embodiment, the pixel array 210 may be implemented as a complementary metal oxide semiconductor (CMOS) transistor. However, the present disclosure is not limited thereto, and it is obvious to those skilled in the art that the integrated gaze tracker 200 according to another embodiment may be implemented as a charge-coupled device (CCD) image sensor.

The memory 230 may be configured to store image data.

The memory 230 may be configured to store an image data unit (e.g., row image data or column image data) to be read out in units of lines (e.g., units of rows or units of columns) based on an output signal from the pixel array 210. The row image data is data included in an image frame, and may mean data corresponding to any one row of the image frame.

Also, the memory 230 may be configured to store partial image data including the row image data (or the column image data). The partial image data is data included in the image frame, and may mean data corresponding to at least one row of the image frame. The partial image data may be a set of at least one row image data.

The memory 230 may be a buffer. For example, the memory 230 may be a line buffer (a line memory) configured to store image data in units of rows.

The memory 230 may be implemented as static random access memory (SRAM) or dynamic random access memory (DRAM), but is not limited thereto.

The memory 230 stores the partial image data so that the memory 230 does not require to be a large-capacity memory, and thus, the memory 230 may be implemented using a small amount of SRAM.

The processor 250 may be configured to generate a gaze vector based on the partial image data including the at least one row image data.

Further, the processor 250 may be configured to determine a start row number and an end row number based on a row number in which the row image data is located in the image frame, and to determine the partial image data to include start row image data corresponding to the start row number and end row image data corresponding to the end row number. Further, the processor 250 may be configured to change at least one of the start row number and the end row number when new row image data is stored in the memory 230.

In addition, when next row image data is stored in the memory 230, the processor 250 may be configured to determine next partial image data to include the next row image data and generate the gaze vector based on the partial image data and the next partial image data.

Further, the processor 250 may be configured to process in a ping pong buffer method using two or more memories 230.

Further, the processor 250 may be configured to process the partial image data stored in the memory 230 in units of columns to generate the gaze vector.

In addition, the processor 250 may be configured to generate the gaze vector based on data generated through feature points detection, ellipse fitting, and pupil center detection.

In addition, the processor 250 may be configured to generate the gaze vector based on a light signal generated by reflecting short wave infrared (SWIR) from a pupil.

In addition, the processor 250 may be configured to output at least one of pupil center position data, pupil feature points data, pupil position data, distance data between pupils, glint position data, and iris data.

Further, the processor 250 may be configured to generate the gaze vector based on a neural network. Further, the processor 250 may include a hardware accelerator configured to perform machine learning. In addition, the processor 250 may include an Application Specific IC (ASIC) implemented for machine learning or image processing.

Also, the processor 250 may be configured to output the gaze vector using a Mobile Industry Processor Interface (MIPI).

Further, the processor 250 may be configured to output the gaze vector using a serial interface.

The integrated gaze tracker 200 includes the pixel array 210, the memory 230, and the processor 250 therein, thereby improving a generation speed of the gaze vector, compared to using a memory and a processor outside a gaze tracker. For example, when using the memory outside the gaze tracker 200, an image sensor captures an image, transmits the captured image to the memory 230, stores the image in the memory, and then the gaze tracker needs to perform a process of accessing the memory and generating the gaze vector. However, in the case of the integrated gaze tracker 200, the image may be captured by the pixel array 210 and immediately stored in the memory 230, and stored image data may be processed by the processor 250 to generate the gaze vector. Accordingly, the integrated gaze tracker 200 may improve the generation speed of the gaze vector by reducing a time to access the memory, a time to transmit the image data, a latency, etc. More detailed descriptions related to this will be described later.

Figure 3:
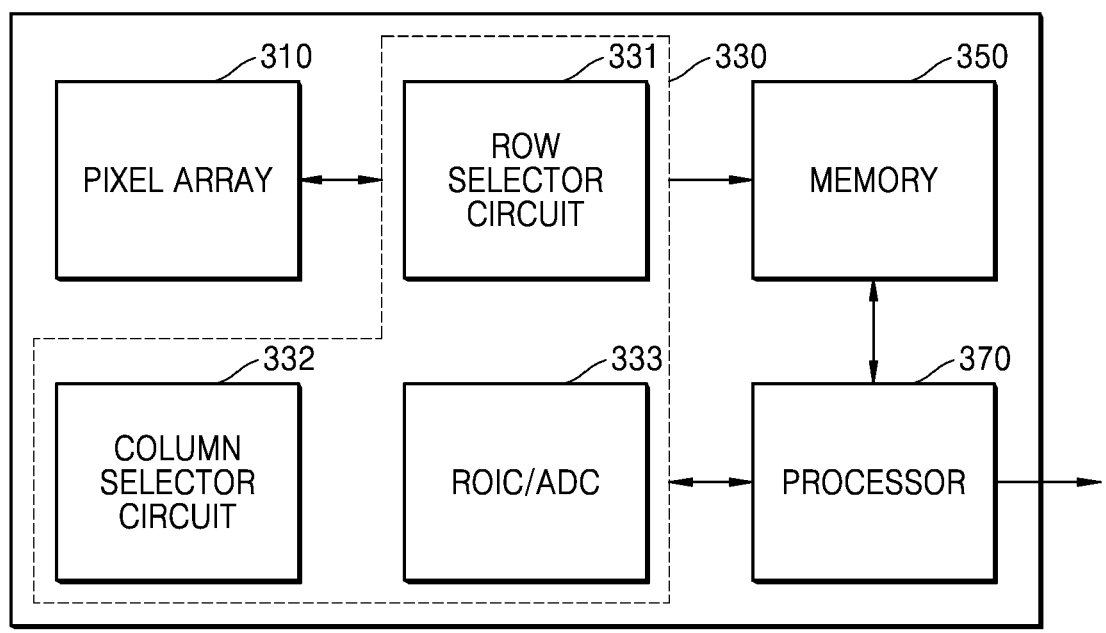
FIG. 3 is a diagram illustrating components of an integrated gaze tracker according to an embodiment.

FIG. 3 is a diagram illustrating components of an integrated gaze tracker 300 according to an embodiment.

Referring to FIG. 3, the integrated gaze tracker 300 according to an embodiment includes a pixel array 310, an analog circuit 330, a memory 350, and a processor 370. The analog circuit 330 according to an embodiment includes a row selector circuit 331, a column selector circuit 332, and an analog signal processing circuit 333. In addition, the analog signal processing circuit 333 according to an embodiment includes a read-out integrated circuit (ROIC) and/or analog-digital converter (ADC).

The integrated gaze tracker 300, the pixel array 310, the memory 350, and the processor 370 according to an embodiment may respectively correspond to the integrated gaze tracker 200, the pixel array 210, and the memory 230, and the processor 250 of FIG. 2 and may perform the same functions.

The integrated gaze tracker 300 may determine a position of a user's pupil during a process of generating a gaze vector. Accordingly, the integrated gaze tracker 300 may capture an image to generate the gaze vector, and then may estimate the position where the user's pupil is likely to be when capturing a next image. The integrated gaze tracker 300 may capture the image using only a part of the pixel array 310 by estimating the position where the user's pupil is likely to be. In other words, the integrated gaze tracker 300 may activate only a pixel array corresponding to the position where the user's pupil is likely to be. For example, the integrated gaze tracker 300 may activate only the part of the pixel array 310 by controlling the row selector circuit 331 and the column selector circuit 332. The integrated gaze tracker 300 may reduce power consumption by activating only the part of the pixel array 310.

The row selector circuit 331 may be configured to activate pixels of the pixel array 310 based on a control signal. The row selector circuit 331 may activate pixels in units of rows.

The column selector circuit 332 may be configured to output a column selection signal for readout based on the control signal. The column selector circuit 332 may output the column selection signal for selecting columns of some pixels or all columns of the pixel array 310.

The pixels may be controlled in units of rows by the row selector circuit 331 and output signals of the pixels may be controlled in units of columns by the column selector circuit 332, and thus, shapes of the pixels to be activated may be set to arbitrary shapes.

The column selector circuit 332 according to another embodiment may be configured to activate the pixels of the pixel array 310 based on the control signal. That is, the column selector circuit 332 may be configured to perform the same function as the row selector circuit 331.

Figure 4:
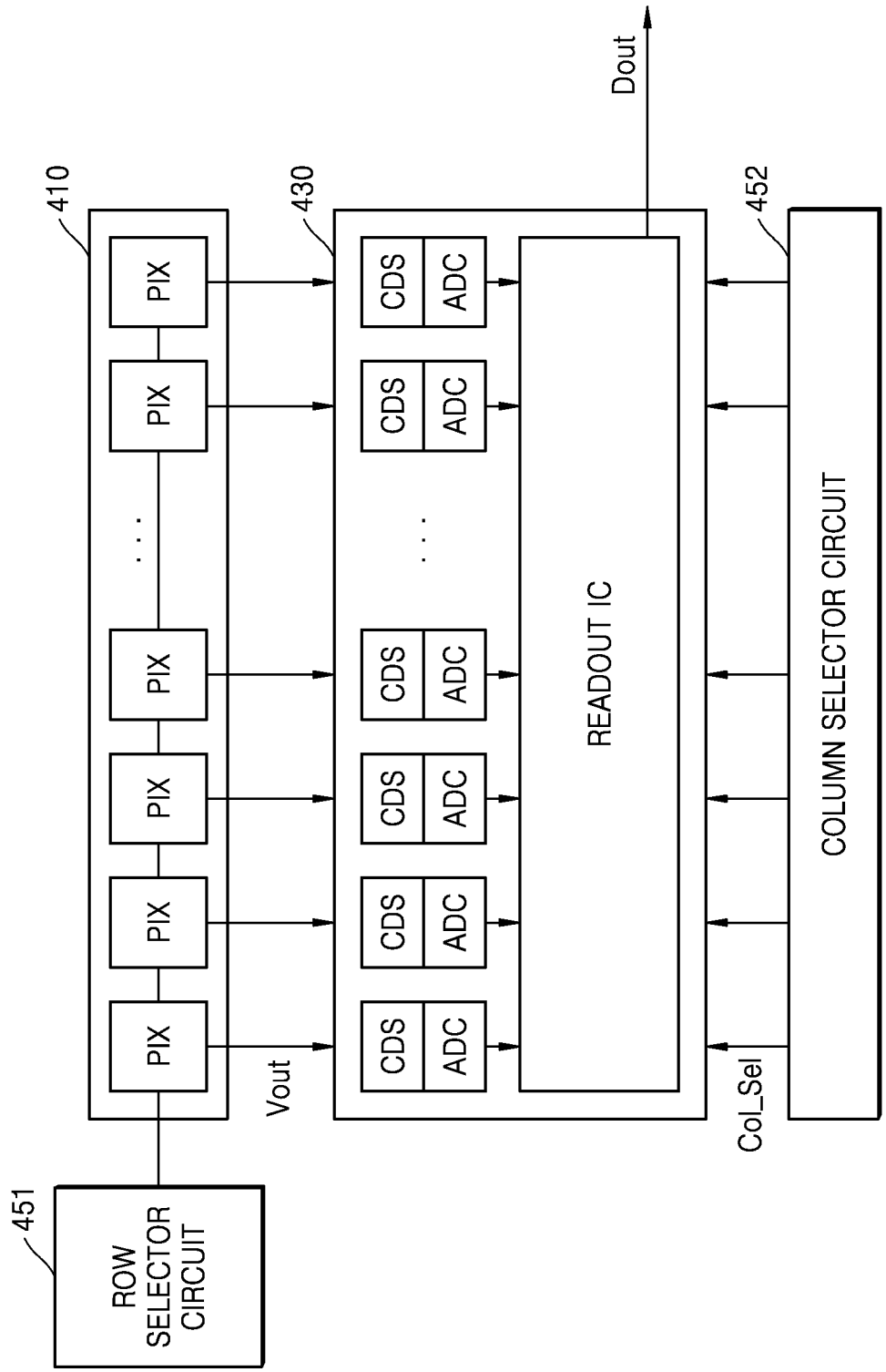
FIG. 4 is a diagram illustrating a method of processing output signals of pixels according to an embodiment.

FIG. 4 is a diagram illustrating a method of processing output signals of pixels 410 according to an embodiment.

Referring to FIG. 4, the pixels 410 of a row selected by a row selector circuit 451 may be activated. The pixels 410 may output a voltage corresponding to light as an output signal Vout. The output signals Vout of the pixels 410 may be transmitted to an analog signal processing circuit 430.

The analog signal processing circuit 430 may be configured to read out image data Dout by processing the output signal Vout.

A column selector circuit 452 may output a column selection signal for selecting columns of pixels corresponding to a sub-region or all columns of a pixel array.

A readout circuit READOUT IC of the analog signal processing circuit 430 may be configured to read the output signal of pixels corresponding to a digitized sub-region or pixels of all digitized columns based on a column selection signal Col_Sel.

In FIG. 4, the analog signal processing circuit 430 is implemented as a correlated double sampling (CDS) circuit, an ADC, and a readout circuit, but is not limited thereto. For example, the analog signal processing circuit 430 may further include a CDS circuit electrically connected to an output terminal of the ADC, or may include a programmable gain amplifier (PGA). As another example, the analog signal processing circuit 430 may be configured to include CDSes connected in parallel and ADCs connected in series.

Figure 5:
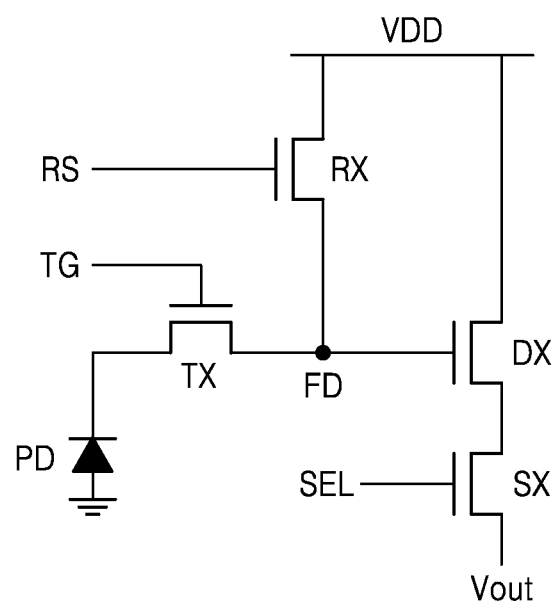
FIG. 5 is a diagram illustrating a pixel according to an embodiment.

FIG. 5 is a diagram illustrating a pixel according to an embodiment.

Referring to FIG. 5, the pixel of an integrated gaze tracker according to an embodiment may have a 4-transistor-active pixel sensor (4T-APS) structure. Unlike this, it is obvious to those of ordinary skill in the art that the pixel may be implemented as a3-T APS, a 5-T APS, etc.

In an embodiment, a transfer control signal TG, a reset signal RS, and a selection signal SEL may be output from a row selector circuit.

A photodiode PD generates charge according to incident light. The photodiode PD may be implemented as a phototransistor, a photogate, or a pinned photodiode (PPD), but is not limited thereto.

A transfer transistor TX transfers the charge of the photodiode PD to a floating diffusion FD node in response to the transfer control signal TG. A reset transistor RX resets the floating diffusion FD node in response to the reset signal RS. A drive transistor DX functions as an amplifier that operates in response to the voltage of the floating diffusion FD node. A voltage VDD is applied to the reset transistor RX and the drive transistor DX. A select transistor SX outputs an output signal Vout corresponding to the charge generated by the photodiode PD in response to the selection signal SEL.

The voltage of a gate of the transfer transistor TX is related to the maximum quantity of charge that the photodiode PD may accumulate. In an embodiment, the row selector circuit may adjust the transfer control signal TG to adjust the quantity of charge of the photodiode PD according to an exposure time.

Figure 6:
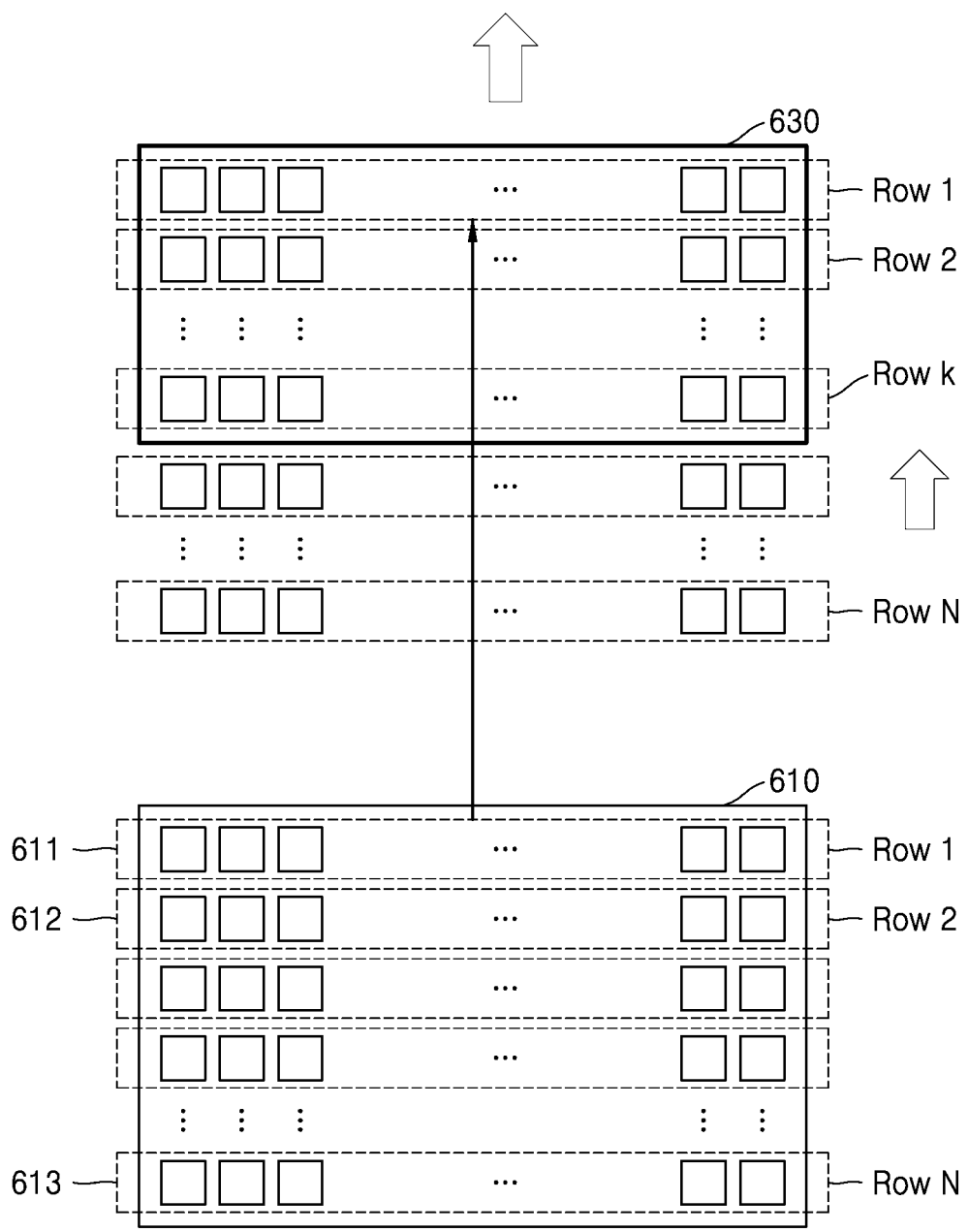
FIG. 6 is a diagram illustrating row image data and partial image data according to an embodiment.

FIG. 6 is a diagram illustrating row image data 611, 612, and 613 and partial image data 630 according to an embodiment.

Referring to FIGS. 2 and 6, the memory 230 may be configured to store the row image data to be read out in units of rows based on an output signal of the pixel array 210.

FIG. 6 shows an image frame 610 configured as N rows. Row numbers from 1 to N may be given from the topmost row to the bottommost row of the image frame 610. The row image data represents data included in any one of the rows 1 to N of the image frame 610. Specifically, the row image data 611 is image data included in a first row Row 1, the row image data 612 is image data included in a second row Row 2, and the row image data 613 is image data included in an N-th row N.

The pixel array 210 outputs the image data in units of rows, and thus the row image data may be sequentially stored in the memory 230. For example, after the row image data 611 is stored in the memory 230, the row image data 612 may be stored in the memory 230, and finally, the row image data 613 may be stored in the memory 230.

The processor 250 may read the partial image data 630 from the memory 230 to generate a gaze vector. The partial image data 630 may include at least one row image data. The partial image data 630 may include a previously determined number of row image data. For example, the number of row image data that may be included in the partial image data 630 may be determined based on a size of a block required for processing by the processor 250.

The processor 250 may read the partial image data 630 including a k number of row image data from the memory 230 to perform processing. In this regard, k may be less than N.

Because the integrated gaze tracker 200 according to an embodiment is integrated with the pixel array 210, the memory 230, and the processor 250, when only the partial image data 630 is stored in the memory 230, the processor 250 may generate a gaze vector. Therefore, compared to a method of generating a gaze vector after an image frame is stored in a memory, a processing speed is faster.

Figure 7A:
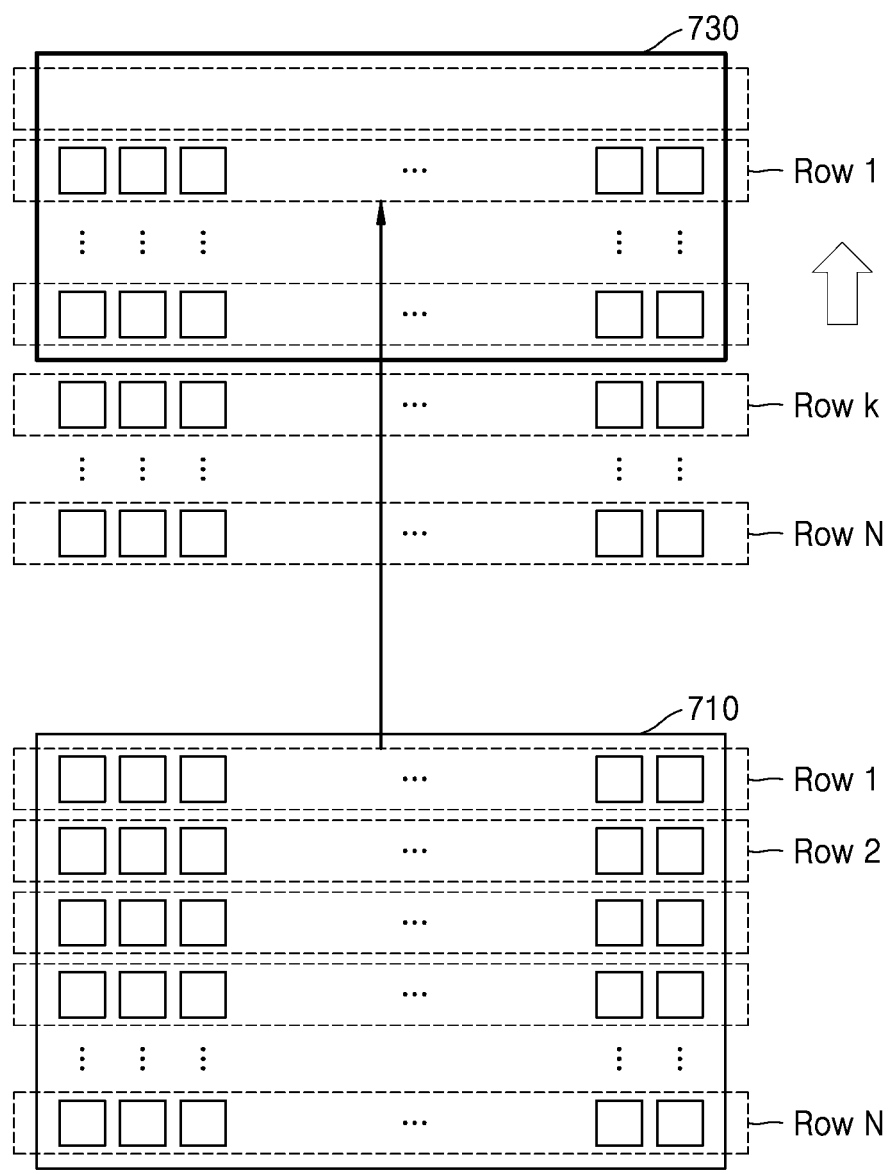
FIGS. 7A to 7C are diagrams illustrating image data stored in a memory according to an embodiment.
Figure 7B:
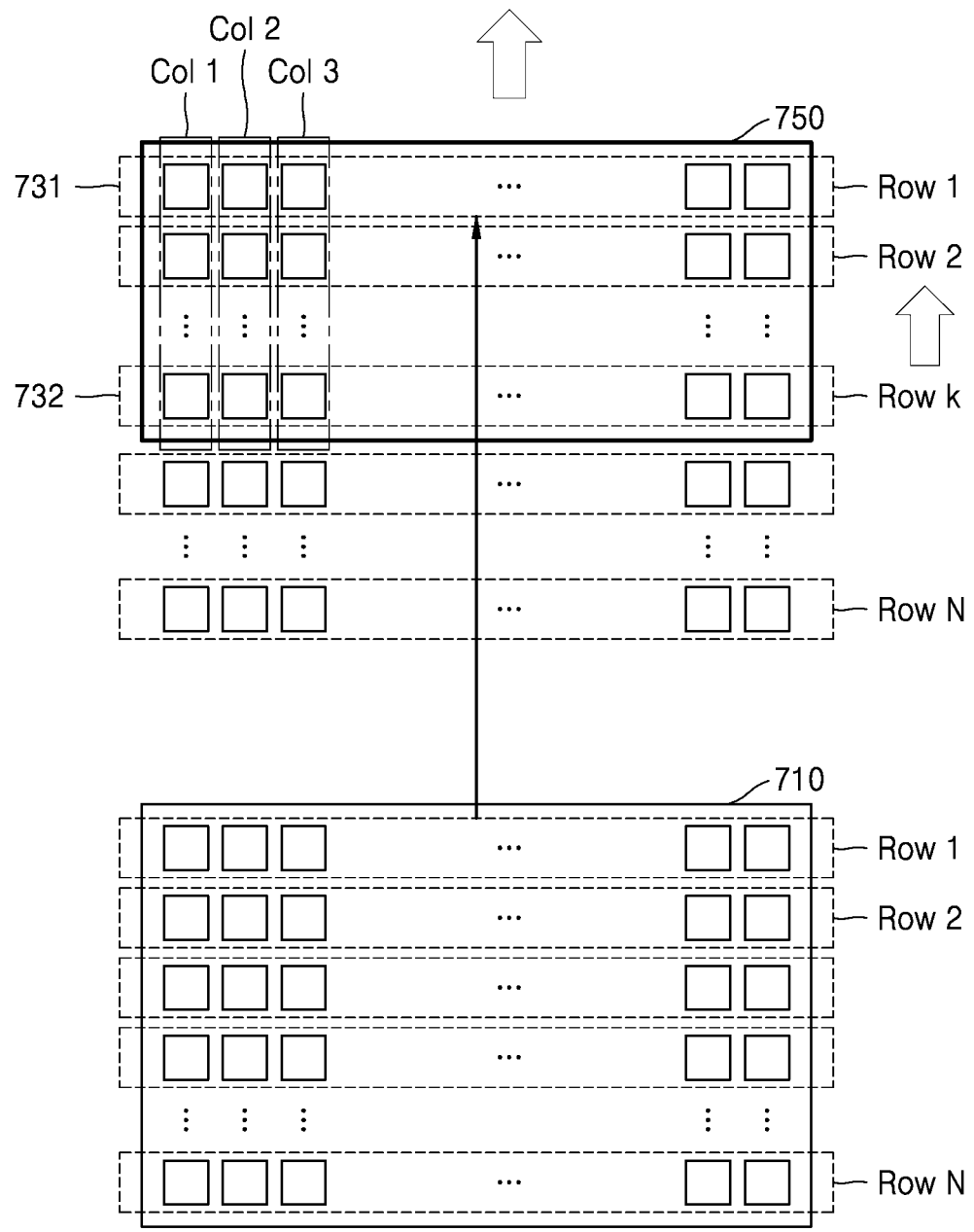
Figure 7C:
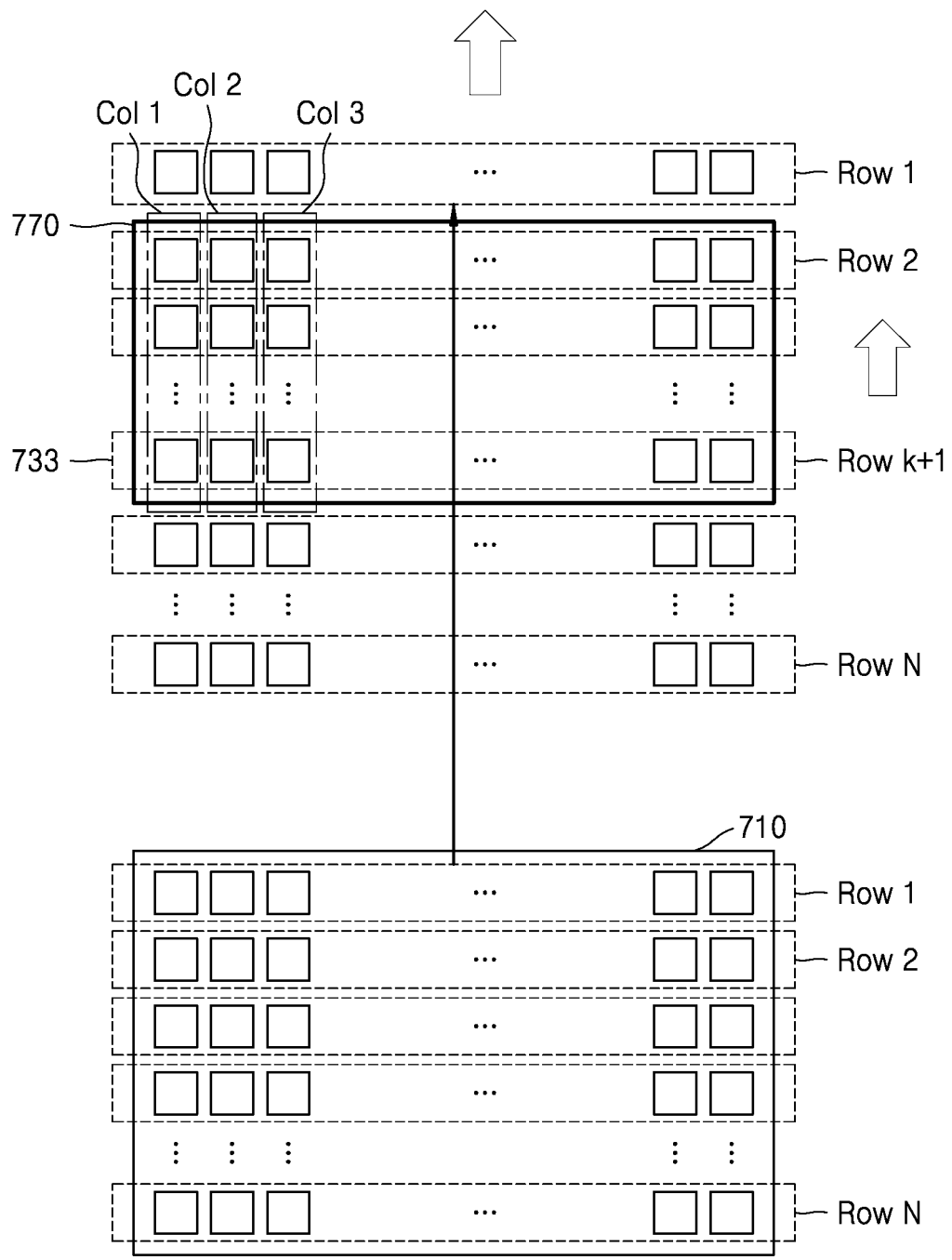

FIGS. 7A to 7C are diagrams illustrating image data stored in the memory 230 according to an embodiment.

Referring to FIGS. 2 and 7A, the memory 230 may be configured to store row image data to be read out in units of rows based on an output signal of the pixel array 210. For example, the memory 230 may be configured to sequentially store the image data in units of rows from the first row Row 1 to the N-th row Row N based on the output signal from the pixel array 210.

The processor 250 may be configured to perform processing when a previously determined number of row image data is stored in the memory 230. For example, the processor 250 may be configured to perform processing when a k number of row image data is stored in the memory 230.

Also, the processor 250 may be configured to read the image data from the memory 230 in units of blocks (e.g., sub-frames) rather than in units of frames to perform processing. That is, the processor 250 may be configured to read the image data from the memory 230 in units of partial image data to perform processing.

FIG. 7A shows an embodiment in which row image data 730 from a first row to a k−1th row of image frames 710 is stored in the memory 230, and k row image data is required for the processor 250 to perform processing. Because row image data required for the processor 250 to perform processing is not sufficiently stored in the memory 230, the processor 250 may not start processing.

FIG. 7B shows the row image data from the first row Row 1 to the k-th row Row k stored by sequentially storing the row image data in the memory 230.

Referring to FIGS. 2 and 7B, the processor 250 may be configured to determine a start row number and an end row number based on a row number in which the row image data is located in an image frame, and determine partial image data to include start row image data corresponding to the start row number and end row image data corresponding to the end row number. For example, the processor 250 may determine the start row number as 1 and the end row number as k, and determine the row image data from start row image data 731 to end row image data 732 as partial image data 750. Accordingly, as shown in FIG. 7B, the row image data from the first row Row 1 to the k-th row Row k is stored, and thus, the processor 250 may start processing. For example, the processor 250 may be configured to generate a gaze vector based on the partial image data 750 stored in the memory 230.

Further, the processor 250 may be configured to generate the gaze vector by processing the partial image data 750 stored in the memory 230 in units of columns. For example, the processor 250 may generate the gaze vector by performing an operation such as Gaussian filtering or Sobel filtering on k pixel data included in a first column Col 1.

FIG. 7C shows the row image data from a second row Row 2 to a k+1-th row Row k+1 stored by sequentially storing the row image data in the memory 230.

Referring to FIGS. 2, 7B, and 7C, when the partial image data 750 of FIG. 7B is all processed, next row image data 733 may be sequentially stored in the memory 230. The processor 250 may be configured to change at least one of the start row number and the end row number when the next row image data 733 is stored in the memory 230. For example, the start row number and the end row number included in the partial image data 770 may be sequentially changed from 1 and k to 2 and k+1. Accordingly, the partial image data 770 from the second row Row 2 to the k+1-th row Row k+1 may be stored in the memory 230. After processing the partial image data 750, the processor 250 may process the partial image data 770. Until row image data of a last row is stored in the memory 230, the above-described processes are repeated, and thus, the processor 250 may generate the gaze vector based on sequentially changing partial image data.

The integrated gaze tracker 200 may enhance security by storing only partial image data in the memory 230 and sequentially processing a plurality of partial image data in the processor 250, as described above. For example, for gaze tracking, an image including a user's pupil needs to be captured, and may include information about a user's iris. Because iris information may be used as personal authentication information, information stored in a memory is leaked, which may cause a serious security problem. However, the memory 230 included in the integrated gaze tracker 200 stores only partial image data, not the entire image frame, and the processor 250 performs processing based on the partial image data, and thus, there is no fear that the entire image frame leaks. Also, because the integrated gaze tracker 200 generates the gaze vector only through internal processing without exchanging data with an external device, there is no fear that image data leaks to the outside. Therefore, security may be enhanced by using the integrated gaze tracker 200.

Figure 8:
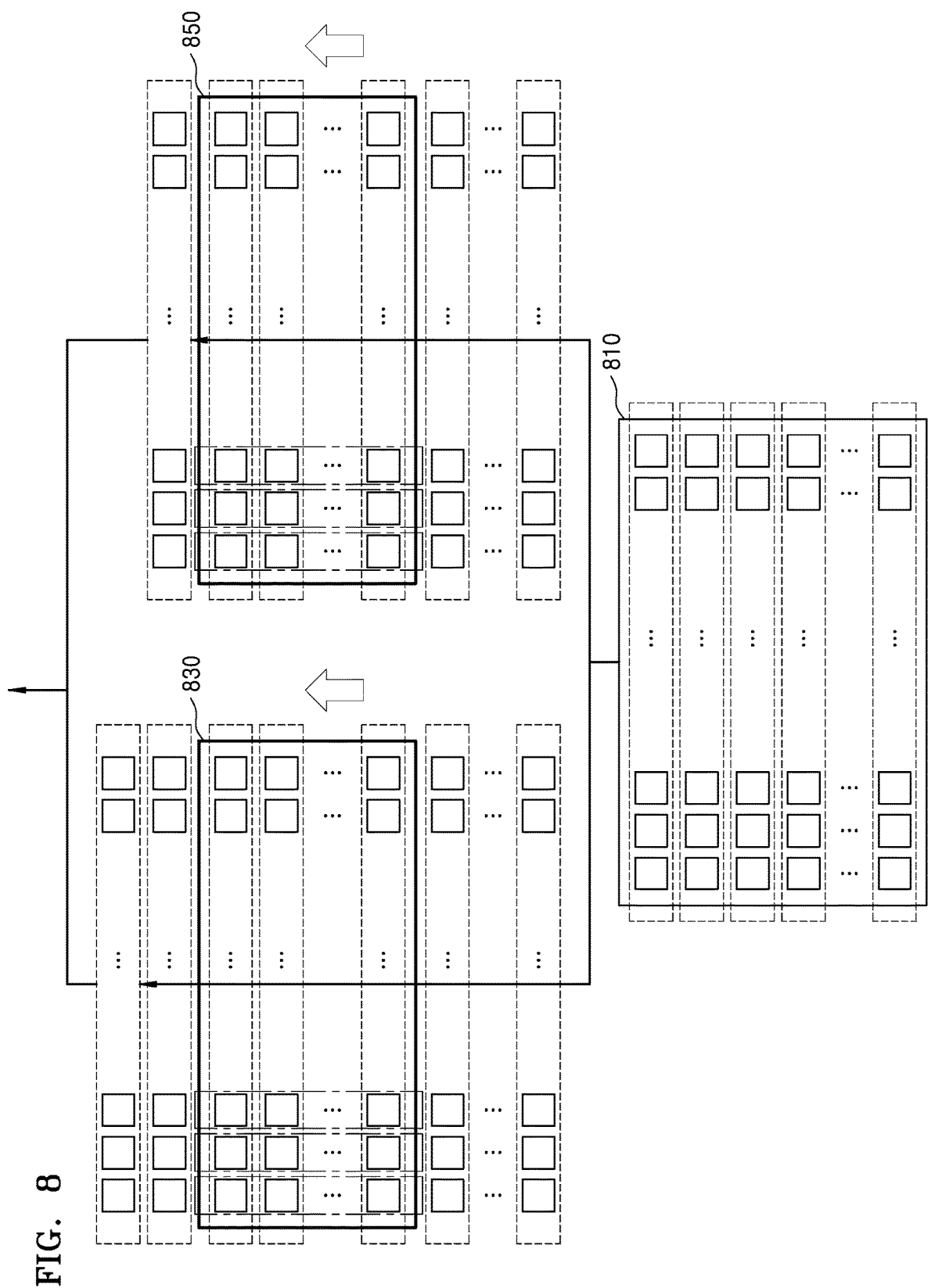
FIG. 8 is a diagram illustrating a memory according to an embodiment.

FIG. 8 is a diagram illustrating the memory 230 according to an embodiment.

Referring to FIGS. 2 and 8, the memory 230 may include two or more storage areas 830 and 850, the two or more storage areas 830 and 850 may be configured to store different partial image data, and the processor 250 may be configured to process different partial image data in a ping pong buffer method. In this regard, the two or more storage areas 830 and 850 may be areas that may be logically divided to store data in the memory 230.

For example, referring to FIG. 8, the memory 230 may include the two storage areas 830 and 850. The processor 250 may process partial image data by storing the partial image data of an image frame 810 in the two storage areas 830 and 850. While storing row image data in the storage area 830, the processor 250 may not process the data stored in the storage area 830. Also, while the processor 250 processes the partial image data stored in the storage area 830, next row image data may not be stored. Accordingly, the memory 230 further includes the storage area 850 logically separated from the storage area 830, thereby storing next partial image data in the storage area 830 while the partial image data is processed in the storage area 850 and storing next partial image data in the storage area 850 while the partial image data stored in the storage area 830 is processed.

In addition, the integrated gaze tracker 200 may include two or more memories 230, and the processor 250 may be configured to process data in the ping pong buffer method using the two or more memories 230. In other words, the processor 250 may perform processing in the ping pong buffer method as described above by using physically separated memories 230.

As described above, the processor 250 performs processing in the ping pong buffer method, and thus, image data storage and processing may be performed simultaneously. Accordingly, a gaze tracking speed is improved, thereby solving a problem of rendering a position where a user gazes at a previous time with a gaze vector calculated by using an image obtained at the previous time because the gaze tracking speed is not fast enough.

Figure 9A:
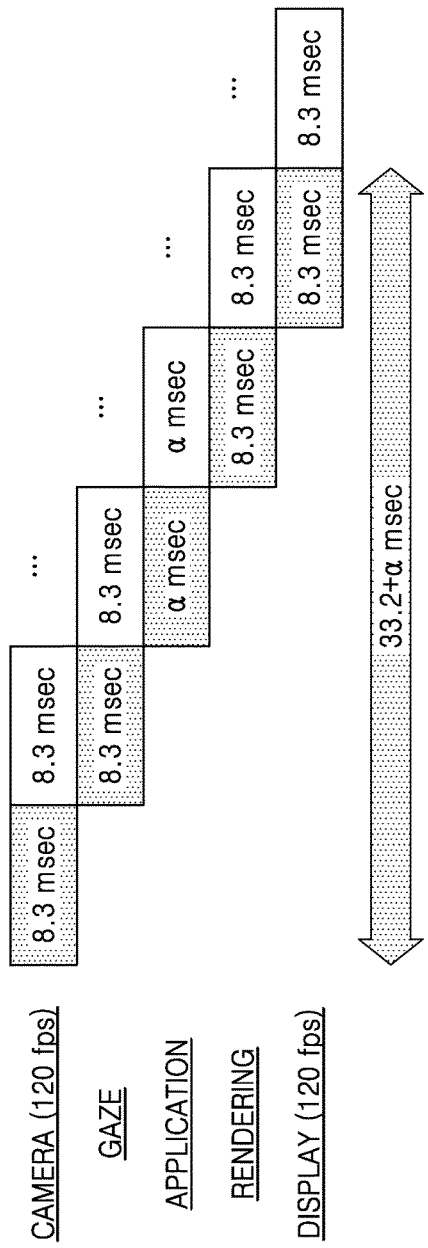
FIGS. 9A and 9B are diagrams illustrating a latency according to an embodiment.
Figure 9B:
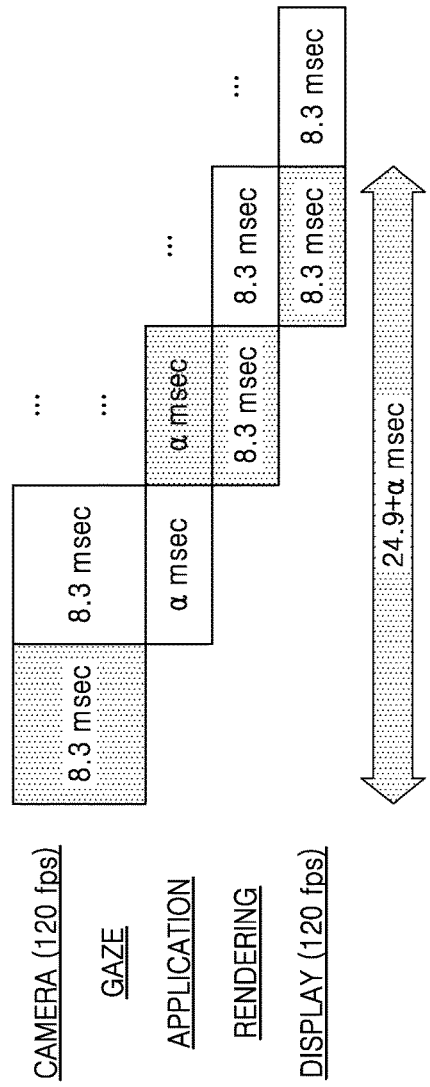

FIGS. 9A and 9B are diagrams illustrating a latency according to an embodiment.

FIG. 9A is a diagram illustrating a time consumed to display a gaze vector when an integrated gaze tracker is not used.

Referring to FIG. 9A, a process of displaying the gaze vector may include a process of capturing an image with a camera, generating the gaze vector, applying the gaze vector to an application, rendering the gaze vector, and displaying the gaze vector. In this regard, the application may be foveated rendering, a variable-focal support, or the like, and it is obvious to those skilled in the art that various other applications may be used.

It may be assumed that a time taken to process one job in a pipeline is 8.3 msec. For example, it may take 8.3 msec to capture the image with the camera, 8.3 msec to generate the gaze vector, 8.3 msec to render the gaze vector, and 8.3 msec to display the gaze vector. In the case of an application, because each application consumes a different time, it is expressed that α msec is consumed. Therefore, a total of 33.2+α msec may be consumed in the process of displaying the gaze vector.

FIG. 9B is a diagram illustrating a time consumed to display the gaze vector when the integrated gaze tracker according to an embodiment is used.

Referring to FIG. 9B, when the integrated gaze tracker according to an embodiment is used, because there is no process of storing the image captured by the camera in an external memory, the process of capturing the image with the camera and generating the gaze vector is performed at once, and thus, it may take 8.3 msec to capture the image with the camera and generate the gaze vector. Thus, a total of 24.9+α msec may be consumed to display the gaze vector. That is, when the integrated gaze tracker is used, the latency may be reduced, and thus, the gaze vector may be reflected and displayed faster than when the integrated gaze tracker is not used. Accordingly, it is possible to solve the problem of displaying a position where a user gazes at a previous time with the gaze vector calculated by using an image obtained at the previous time.

Figure 10A:
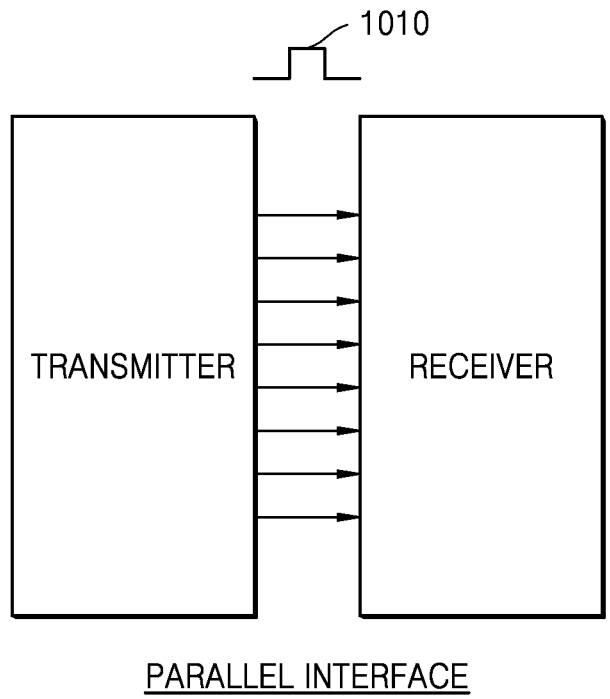
FIGS. 10A and 10B are diagrams illustrating an interface according to an embodiment.
Figure 10B:
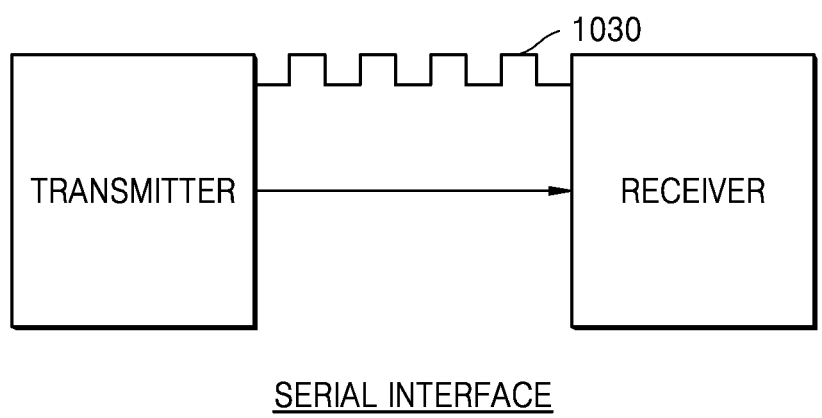

FIGS. 10A and 10B are diagrams illustrating an interface according to an embodiment.

FIG. 10A is a diagram illustrating a parallel interface, and FIG. 10B is a diagram illustrating a serial interface.

Referring to FIGS. 10A and 10B, when the parallel interface is used, a signal 1010 may be transmitted in parallel, but when the serial interface is used, a signal 1030 is sequentially transmitted. Therefore, the serial interface may be mainly used when an output data rate is not large.

When the serial interface is used as the interface, data may be output using only two pins, a data pin and a clock pin, and thus, a form factor of a device using the serial interface may be reduced.

In the case of using the integrated gaze tracker according to an embodiment, only information generated by processing sequentially stored partial image data is output instead of outputting the entire captured image frame, and thus, the output data rate may be greatly reduced. For example, assuming that a size of an image frame is 640×640, a size of a pixel is 10 bits per pixel, and the entire image frame is processed to output data, the data per frame is 4.1 Mbits, and assuming that 120 frames per second are output, the output data rate is about 490 Mbps. However, in the case of using the integrated gaze tracker according to an embodiment, data generated by processing partial image data, not data with respect to the entire image frame, is output, and thus, the output data rate may be only hundreds or thousands of bps. Thus, a processor of the integrated gaze tracker may be configured to generate a gaze vector using the serial interface. When the integrated gaze tracker uses the serial interface, the integrated gaze tracker may be implemented in a small form factor as described above, and thus, the integrated gaze tracker may be efficiently used in an HMD, a VR headset, AR glasses, etc. requiring the small form factor.

In addition, it is obvious to those skilled in the art that various interfaces may be used for the integrated gaze tracker in addition to the serial interface. For example, the processor of the integrated gaze tracker according to an embodiment may be configured to output the gaze vector using an MIPI. The integrated gaze tracker has a small output data rate, thereby reducing power consumption when using the MIPI. Accordingly, the integrated gaze tracker 200 may be efficiently used in the HMD, the VR headset, the AR glasses, etc. that require a small amount of power consumption.

Figure 11A:
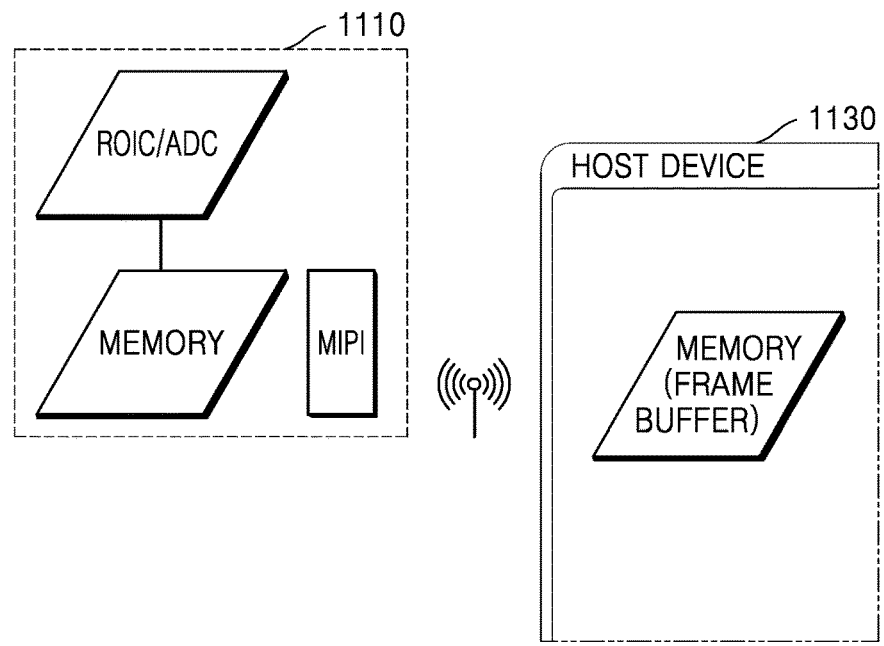
FIGS. 11A and 11B are diagrams illustrating a system according to an embodiment.
Figure 11B:
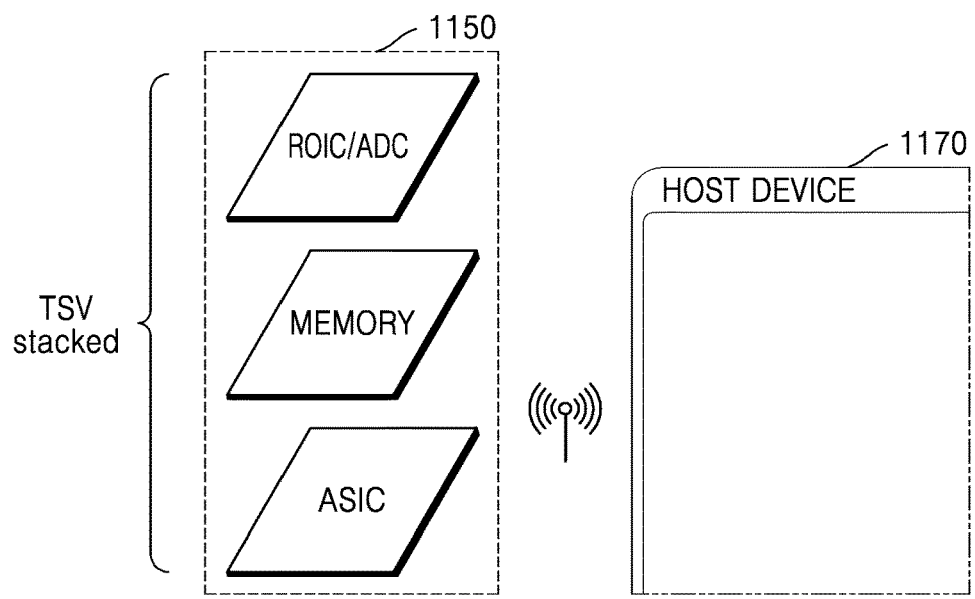

FIGS. 11A and 11B are diagrams illustrating a system according to an embodiment.

FIG. 11A is a diagram illustrating a system for transmitting data without using an integrated gaze tracker.

Referring to FIG. 11A, because a gaze tracker 1110 needs to transmit the entire image frame, an output data rate is relatively high, and thus, an MIPI is used instead of a serial interface. In addition, power required to transmit data to a host device 1130 due to the relatively high output data rate is also relatively large. For example, in order for the gaze tracker 1110 to wirelessly transmit the data to the host device 1130, 1 to 5 W of power may be consumed by using a Wi-Fi method with a large bandwidth.

FIG. 11B is a diagram illustrating a system for transmitting data using a TSV stacked integrated gaze tracker 1150 according to an embodiment.

Referring to FIG. 11B, because the integrated gaze tracker 1150 according to an embodiment has a relatively small output data rate as described above, relatively less power may be consumed when transmitting data. For example, in order for the integrated gaze tracker 1150 to wirelessly transmit data to a host device 1170, 20 mW of power may be consumed by using a method such as Bluetooth having a small bandwidth. Therefore, when the integrated gaze tracker 1150 is used, power consumption may be greatly reduced.

Figure 12:
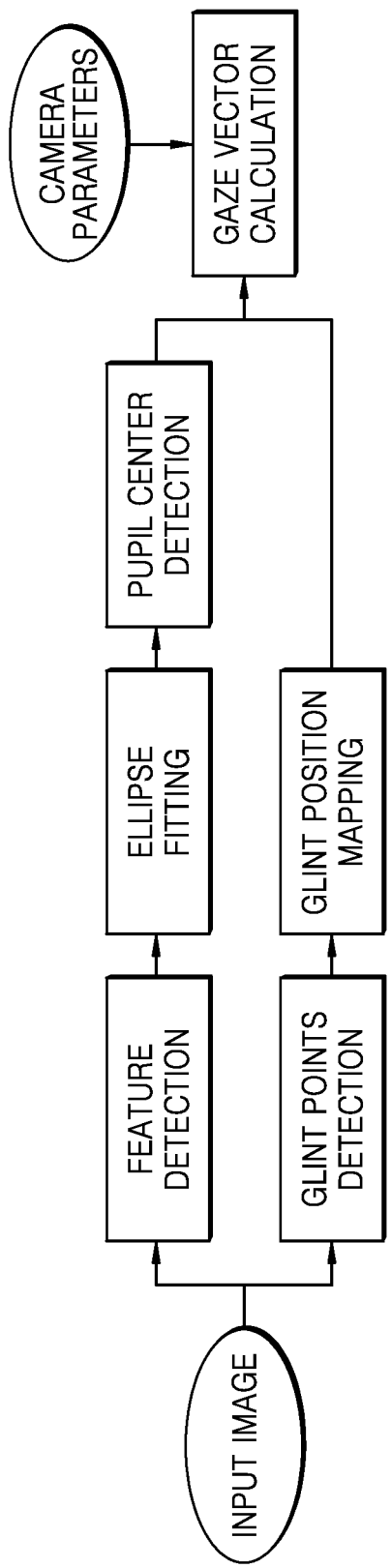
FIG. 12 is a diagram illustrating generation of a gaze vector according to an embodiment.

FIG. 12 is a diagram illustrating generation of a gaze vector according to an embodiment.

An integrated gaze tracker according to an embodiment may use a feature points detection method or a glint points detection method to generate the gaze vector.

The feature points detection method includes detecting a pupil center by filtering a pupil image included in a captured image. When the pupil center is detected, ellipse fitting may be utilized. Accordingly, a processor may be configured to generate the gaze vector based on data generated by feature points detection, ellipse fitting, and pupil center detection. In addition, the gaze vector may be generated by synthesizing data obtained by detecting the pupil center and camera parameters. The camera parameter may include position information of a camera, information about a lens, etc., but is not limited thereto.

The glint points detection method uses a short wave infrared light emitting diode (SWIR LED) and may include generating the gaze vector by illuminating SWIR light to the pupil, detecting light reflected from the pupil, and mapping a glint position. Accordingly, the processor may be configured to generate the gaze vector based on a light signal generated by reflecting SWIR to the pupil. When the gaze vector is generated, camera parameters may be utilized.

Further, the processor may be configured to generate the gaze vector based on a neural network. For example, when a neural network is used, a certain number of pieces of row image data are sequentially stored in a memory, and when a block having a required size is configured, the gaze vector may be generated using a convolution neural network (CNN) method. When training of the neural network is performed, there is no need to limit resources, and thus, the entire image data may be input to the neural network to perform training.

In addition, the processor may generate the gaze vector by using an image of an RGB band captured by a monochrome camera.

Figure 13:
FIG. 13 is a diagram illustrating generation of a gaze vector according to an embodiment.

FIG. 13 is a diagram illustrating generation of a gaze vector 1330 according to an embodiment.

The gaze vector 1330, which is a direction in which a user's pupil 1350 gazes, may be generated using an integrated gaze tracker 1310 according to an embodiment, and may be displayed on a display. The integrated gaze tracker 1310 may obtain data about a feature point of a pupil 1350, a position of a pupil 1350, iris information, a position of the center of the pupil 1350, or a glint position by using the above-described methods. In addition, the above-described data may be used not only for generating the gaze vector 1330, but also for other purposes (for example, personal authentication information), and thus, the integrated gaze tracker 1310 may output the above-described data. In other words, a processor may be configured to output at least one of feature points data of the pupil 1350, position data of the pupil 1350, distance data between pupils 1350, glint position data, and iris data.

Figure 14:
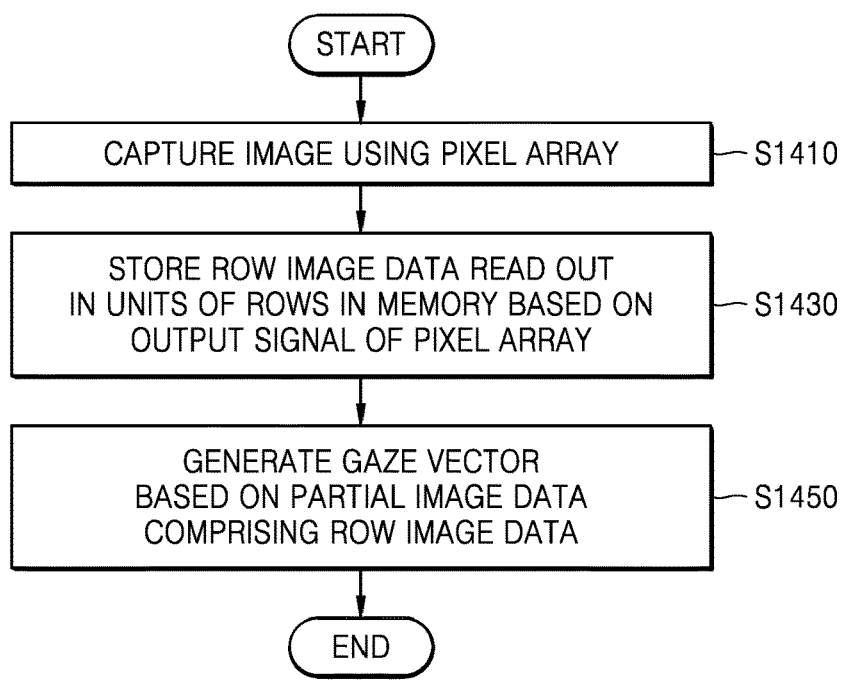
FIG. 14 is a flowchart illustrating an operation method of an integrated gaze tracker according to an embodiment.

FIG. 14 is a flowchart illustrating an operation method of an integrated gaze tracker according to an embodiment.

Referring to FIGS. 2 and 14, in operation S1410, the integrated gaze tracker 200 may capture an image using a pixel array.

In operation S1430, the integrated gaze tracker 200 may store row image data read out in units of rows in a memory based on an output signal of the pixel array.

In operation S1450, the integrated gaze tracker 200 may generate a gaze vector based on partial image data including the row image data.

Meanwhile, the above described embodiments may be written in a program executable on a computer, and may be implemented on a general purpose digital computer that executes the program using a computer-readable recording medium. In addition, the structure of data used in the above described embodiments may be recorded on a computer-readable recording medium through various means. The computer-readable recording medium includes a storage medium such as a magnetic storage medium (e.g., ROM, a floppy disk, a hard disk, etc.), an optical reading medium (e.g., a CD ROM, a DVD, etc.).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An integrated gaze tracker comprising:
a pixel array configured to capture an image to provide an output signal comprising the image;
a memory configured to store an image data unit to be read out in units of lines based on the output signal of the pixel array; and
a processor configured to generate a first gaze vector based on a first partial image data from an n-th row to a k-th row, among entire image data included in the output signal, and generate a second gaze vector based on a second partial image data from an (n+1)-th row to a (k+1)-th row, among the entire image data.

2. The integrated gaze tracker of claim 1, wherein the processor is further configured to:
determine a start row number and an end row number of the image data unit located in the image; and
determine the first partial image data to comprise start row image data corresponding to the start row number and end row image data corresponding to the end row number.

3. The integrated gaze tracker of claim 2, wherein the processor is further configured to change at least one of the start row number and the end row number when new row image data is stored in the memory.

4. The integrated gaze tracker of claim 1, wherein the memory comprises a line memory configured to store the image in units of rows.

5. The integrated gaze tracker of claim 1,
wherein the memory comprises two or more storage areas,
wherein the two or more storage areas are configured to store different partial image data comprising the first partial image data and the second partial image data, and
wherein the processor is configured to process the different partial image data in a ping pong buffer method.

6. The integrated gaze tracker of claim 1, wherein the memory comprises a static random access memory (SRAM).

7. The integrated gaze tracker of claim 1, wherein the processor is further configured to process the first partial image data stored in the memory in units of columns to generate the first gaze vector.

8. The integrated gaze tracker of claim 1, wherein the processor is further configured to generate the first gaze vector based on data generated through feature points detection, ellipse fitting, and pupil center detection.

9. The integrated gaze tracker of claim 1, wherein the processor is further configured to generate the first gaze vector based on a light signal generated by reflecting short wave infrared (SWIR) to a pupil.

10. The integrated gaze tracker of claim 1, wherein the processor is further configured to output at least one of position data of a pupil center, feature point data of a pupil, position data of the pupil, distance data between pupils, glint position data, or iris data.

11. The integrated gaze tracker of claim 1, wherein the processor is further configured to generate the first gaze vector based on a neural network.

12. The integrated gaze tracker of claim 1, wherein the processor is further configured to output the first gaze vector using a mobile industry processor interface (MIPI).

13. The integrated gaze tracker of claim 1, wherein the processor is further configured to output the first gaze vector using a serial interface.

14. The integrated gaze tracker of claim 1, wherein the integrated gaze tracker is a system on a chip.

15. An operation method of an integrated gaze tracker, the operation method comprising:
capturing an image using a pixel array to provide an output signal comprising the image;
storing an image data unit in a memory to be read out in units of lines based on the output signal of the pixel array; and
performing processing by generating a first gaze vector based on a first partial image data from an n-th row to a k-th row, among entire image data included in the output signal, and generating a second gaze vector based on a second partial image data from an (n+1)-th row to a (k+1)-th row, among the entire image data.

16. The operation method of claim 15, wherein the performing processing comprises:
determining a start row number and an end row number of the image data unit located in the image, and
determining the first partial image data to comprise start row image data corresponding to the start row number and end row image data corresponding to the end row number.

17. The operation method of claim 16, wherein the performing processing comprises changing at least one of the start row number and the end row number when new row image data is stored in the memory.

18. The operation method of claim 15, wherein the memory is a line memory configured to store the image in units of rows.

* * * * *